United States Patent
Trockenbrot, IV

(10) Patent No.: US 11,643,170 B2
(45) Date of Patent: May 9, 2023

(54) TACKLE STORAGE AND SLIDE SYSTEM FOR A BOAT

(71) Applicant: CJBBB, Inc., Winchester, TN (US)

(72) Inventor: Timothy L. Trockenbrot, IV, Meridianville, AL (US)

(73) Assignee: CJBBB, Inc., Winchester, TN (US)

( * ) Notice: Subject to any disclaimer, the term of this patent is extended or adjusted under 35 U.S.C. 154(b) by 0 days.

(21) Appl. No.: 17/380,167

(22) Filed: Jul. 20, 2021

(65) Prior Publication Data

US 2021/0347443 A1 Nov. 11, 2021

Related U.S. Application Data

(62) Division of application No. 17/179,824, filed on Feb. 19, 2021, now Pat. No. 11,097,810.

(60) Provisional application No. 62/979,344, filed on Feb. 20, 2020.

(51) Int. Cl.
| | |
|---|---|
| *B63B 11/00* | (2006.01) |
| *B63B 3/48* | (2006.01) |
| *B63B 17/00* | (2006.01) |
| *A01K 97/06* | (2006.01) |
| *A01K 89/08* | (2006.01) |

(52) U.S. Cl.
CPC .............. *B63B 11/00* (2013.01); *A01K 89/08* (2013.01); *A01K 97/06* (2013.01); *B63B 3/48* (2013.01); *B63B 17/00* (2013.01)

(58) Field of Classification Search
CPC .. B63B 3/48; B63B 3/54; B63B 17/00; B63B 2017/0054; B63B 35/24; A01K 89/08; A01K 97/06
USPC ........... 114/78, 85, 201 R, 343, 364; 43/54.1
See application file for complete search history.

(56) References Cited

U.S. PATENT DOCUMENTS

| | | | |
|---|---|---|---|
| 4,662,303 A | 5/1987 | Duff | |
| 4,768,651 A | 9/1988 | Lanius | |
| 4,770,327 A * | 9/1988 | Fortson | .................. A01K 97/06 |
| | | | 224/406 |

(Continued)

FOREIGN PATENT DOCUMENTS

GB 2278032 A 11/1994

OTHER PUBLICATIONS

Caswell, C., "World Cat 400DC-X", Sport Fishing, vol. 34, Issue 8, Nov./Dec. 2019, pp. 42-43.

(Continued)

*Primary Examiner* — Daniel V Venne
(74) *Attorney, Agent, or Firm* — United IP Counselors, LLC

(57) ABSTRACT

A tackle storage and organization system for a boat, such as a bass boat, is disclosed. A set of supports is installed in a deck compartment of the boat. The supports may be rails installed specifically for the tackle storage and organization system, or they may be the upper edges of existing partitions for subcompartments within the deck compartment. A box or tray is installed on the supports so as to be slideable horizontally along the supports, but is also removable from the supports. The box or tray may be subdivided into any number of compartments, and in some cases, the dividers used may be removable and repositionable in order to adapt to different types of items. The box or tray may have engaging structure to mount a number of accessories, including a spool accessory.

3 Claims, 6 Drawing Sheets

(56) References Cited

U.S. PATENT DOCUMENTS

| | | | |
|---|---|---|---|
| 5,048,447 A | 9/1991 | Vicari | |
| 5,094,375 A * | 3/1992 | Wright | B60R 9/00 |
| | | | 224/567 |
| 5,205,429 A | 4/1993 | Woolworth et al. | |
| 5,704,158 A | 1/1998 | Whiteaker | |
| 5,975,002 A | 11/1999 | Rieger | |
| 6,386,659 B1 * | 5/2002 | Muller | A47B 88/487 |
| | | | 312/334.6 |
| 6,574,911 B1 | 6/2003 | Hurst et al. | |
| 6,880,480 B2 * | 4/2005 | Clouse | A01K 97/06 |
| | | | 114/343 |
| 7,278,234 B2 | 10/2007 | Marino | |
| 7,908,990 B2 | 3/2011 | Strahm et al. | |
| 8,291,851 B2 | 10/2012 | Strahm et al. | |
| 9,796,456 B1 * | 10/2017 | Zarn | A47B 88/43 |
| 11,230,218 B2 * | 1/2022 | Chevalier | B60P 3/36 |
| 2003/0234193 A1 | 12/2003 | Clouse | |

OTHER PUBLICATIONS

Falcon Bass Boats, "Custom Sliding Tackle Tray." Internet. Posted Feb. 20, 2020. Available at: https://www.instagram.com/p/B8yv5FPA6Ad/?igshid=s84szce2mzns.

\* cited by examiner

TACKLE STORAGE AND SLIDE SYSTEM FOR A BOAT

CROSS-REFERENCE TO RELATED APPLICATIONS

This application is a divisional of U.S. patent application Ser. No. 17/179,824, filed Feb. 19, 2021. That application claims priority to, and the benefit of, U.S. Provisional Patent Application 62/979,344, filed Feb. 20, 2020. The contents of both of those applications are incorporated by reference in their entireties.

TECHNICAL FIELD

The invention relates to tackle storage systems, and in particular, to tackle storage systems that are integrated into boats.

BACKGROUND

Bass boats are small boats designed for recreational fishing, usually in freshwater. Generally 18-22 feet in length and made of FIBERGLAS® glass-fiber composite or aluminum, they are typically powered by an outboard motor or motors and commonly provide seating for two passengers, usually in the form of swivel chairs.

Most bass boats have storage compartments built into the deck. These compartments may be used, for example, to store the tackle and supplies used to catch fish, as well as any fish that are caught.

BRIEF SUMMARY

One aspect of the invention relates to a tackle storage and organization system for a boat, such as a bass boat. A set of supports is installed in a deck compartment of the boat. The supports may be rails installed specifically for the tackle storage and organization system, or they may be the upper edges of existing partitions for subcompartments within the deck compartment. A box or tray is installed on the supports so as to be horizontally slideable along the supports, but is also removable from the supports. The box or tray may be subdivided into any number of compartments, and in some cases, the dividers used may be removable and repositionable in order to adapt to different types of items.

In some embodiments, the box or tray may include a mounting structure, particularly on its forward or rear sidewall. The mounting structure allows a number of accessories to be attached to the box or tray. Each of these accessories has a complementary engaging structure to mount on the box or tray. The accessories may include both extension trays that provide more organizing space, and attachments like spool holders to hold fishing line.

Other aspects, features, and advantages of the invention will be set forth in the description that follows.

BRIEF DESCRIPTION OF THE DRAWING FIGURES

The invention will be described with respect to the following drawing figures, in which like numerals represent like features throughout the drawing figures, and in which.

DETAILED DESCRIPTION

Figure 1:
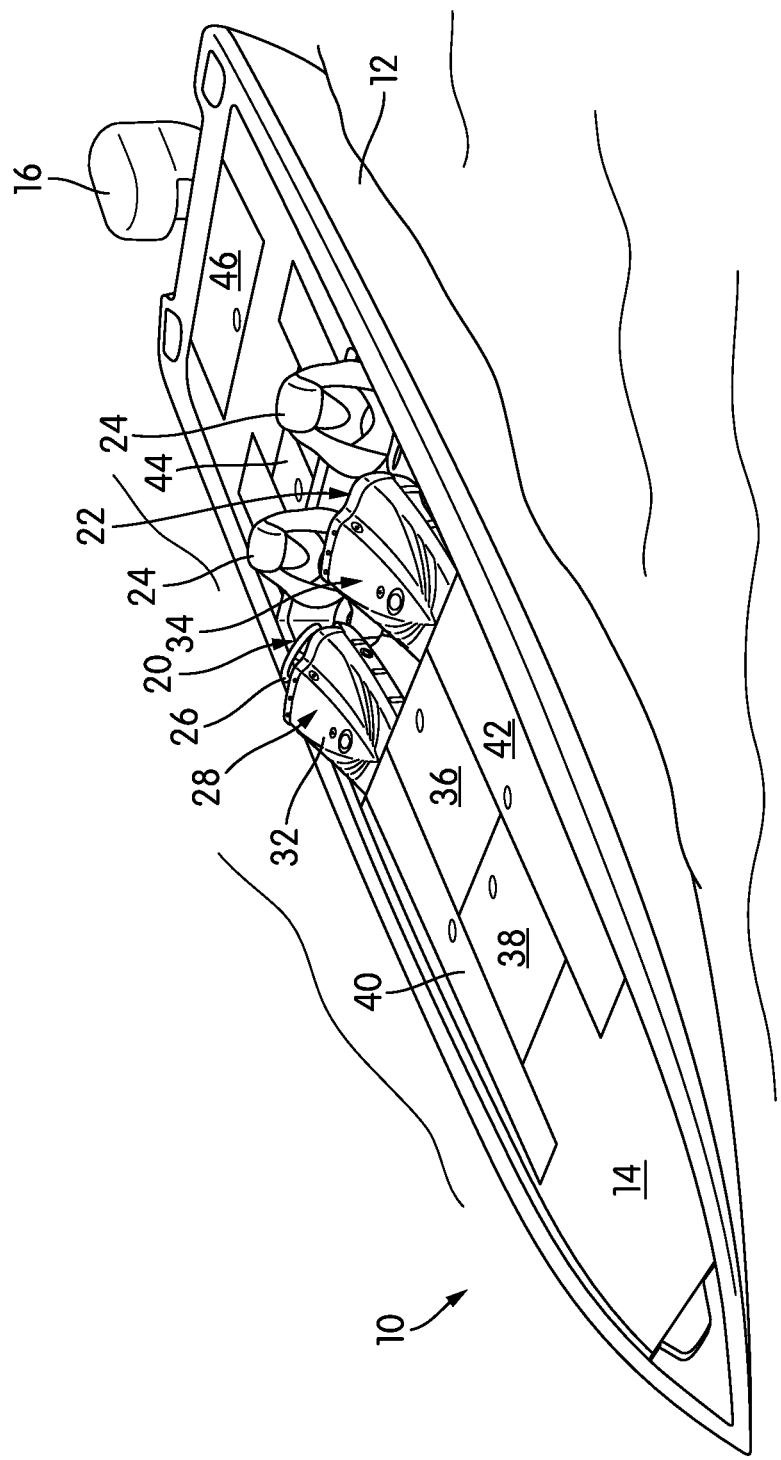
FIG. 1 is a perspective view of a boat with a tackle storage system according to one embodiment of the invention.

FIG. 1 is a perspective view of a boat, generally indicated at 10. The boat 10 includes a hull 12 and a deck 14. The boat 10 is generally of the type used for recreational fishing, and in particular, for bass fishing, although boats 10 according to embodiments of the invention need not be limited to those uses. An outboard motor 16 is provided to propel the boat 10, and in some embodiments, the boat 10 may also include a separate trolling motor for low-speed propulsion during fishing operations (not shown in FIG. 1). The hull 12 and deck 14 of the boat 10 of the illustrated embodiment are made of FIBERGLAS® glass-fiber composite, although in other embodiments, they may be made of other materials.

The boat 10 of FIG. 1 includes two passenger positions side-by-side, one passenger position 20 on the starboard (i.e., right) side and one passenger position 22 on the port (i.e., left) side. Each passenger position 20, 22 includes a chair 24. The chairs 24 of the illustrated embodiment are fixed in forward-facing positions, although chairs 24 in other embodiments of the invention may swivel or have any other desirable features. By convention, the starboard-side passenger position 20 is the pilot's position, although this need not be the case in all embodiments. Because it is the pilot's position, the starboard-side passenger position 20 includes engine controls and a wheel for rudder control, collectively indicated at 26, and a console 28 that includes instrument displays. A windscreen may be connected to an upper surface 32 of the console 28 to shield the pilot from wind. In the illustration of FIG. 1, the port-side passenger position 22 also has a console 34 installed between the bow and the passenger chair 24 to shield the passenger chair 24 from wind.

As can be seen in FIG. 1, the deck 14 has a number of built-in compartments 36, 38, 40, 42, 44, 46 in both its fore and aft sections. The compartments 36, 38, 40, 42, 44, 46 allow for storage, including tackle storage. "Tackle," as that term is used here, refers to any and all equipment that may be used for fishing. In embodiments of the invention, the compartments 36, 38, 40, 42, 44, 46 may have built-in tackle storage and organization systems.

Figure 2:
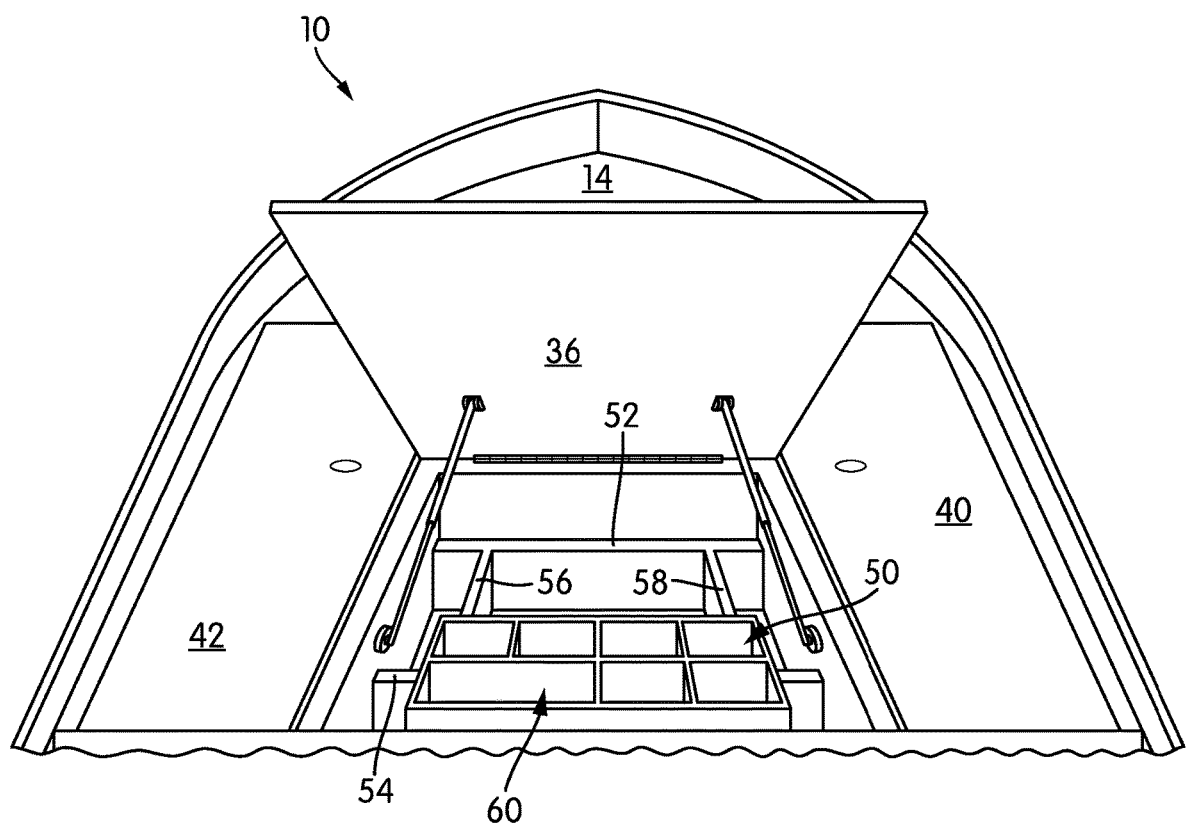
FIG. 2 is a perspective view of an opened deck compartment of the boat of FIG. 1, illustrating a tackle storage and organization system.

FIG. 2 is a perspective view of one of the compartments 36 opened, showing a tackle storage and organization system that is generally indicated at 50. The tackle storage and organization system 50 is mounted within the compartment 36. More specifically, a set of rails 52, 54 that are oriented along the port-starboard direction connect with the sides of the compartment 36 and support a pair of rails 56, 58 that, in the illustrated embodiment, are oriented in the fore-aft direction. These rails 56, 58 may be pre-installed in the compartment 36, or they may be installed specifically as a part of the organization system 50. In some cases, the rails 56, 58 may be the upper portions of sidewalls of partitions or compartments within the compartment 36. While the rails 56, 58 are permanently installed, they need not be installed specifically for the organization system 50; rails, sidewalls, and other suitable structures within an existing compartment 36 may be used.

An organizing tray 60 ("tray" for short, herein) is slidably mounted on the fore-aft rails 56, 58 to slide horizontally along the rails 56, 58. The tray 60 itself is divided into a number of compartments. The partitions that divide the tray 60 into compartments may be removable and positionable, such that the tray itself can be configured in any number of different ways.

While the tray 60 may be permanently mounted for sliding movement along the rails 56, 58, in many cases, it may be advantageous if the tray 60 is removable. A removable tray 60 may be helpful for several reasons. First, a user can remove the tray 60 from the rails 56, 58 and still have access to substantially the entire volume of the compartment 36, in order to store and access larger pieces of equipment. Second, a user can remove the tray 60 from the boat 10 entirely, in order to load and organize it at home or in another such setting, which may be more efficient and make better use of time on the water. The tray 60 may have cut-outs for handles on its sides in order to facilitate handling.

As can be appreciated in FIG. 2, the rails 52, 54, 56, 58 are mounted low enough in the compartment 36 that the compartment lid can close. Typically, the rails 52, 54, 56, 58 are set low enough that the items placed in the tray 60 can extend above the tray for at least some distance. In some embodiments, there may be subcompartments or dividers in the compartment below the tackle storage and organization system 50. As was noted above, the rails 52, 54, 56, 58 need not be rails per se; instead, the rails 52, 54, 56, 58 could be the upper edges of dividers that are already installed within the compartment 36.

While the tray 60 slides horizontally in the fore-aft direction in the illustrated embodiment, that need not be the case in all embodiments. The rails 52, 54, 56, 58 or other supporting structures within the compartment 36—or any of the other compartments 38, 40, 42, 44, 46—could be set to allow the tray 60, or a similar tray, to slide in the port-starboard direction, or even diagonally across the compartment 36.

Thus, the tackle storage and organization system 50 provides space and structure for storing and organizing tackle within a deck compartment 36 of a boat 10. The tray 60 can be removed from the system 50 to be loaded at home or in another location. Generally speaking, the presence of the system 50 does not infringe on other organizational features or subcompartments that may be present in a compartment 36, and the system 50 may use existing subcompartment sidewalls or rails as support structure for a sliding tray 60.

Methods of mounting the tray 60 on the rails 56, 58 may vary from embodiment to embodiment. In some embodiments, the tray 60 may simply rest on the rails 56, 58. In other embodiments, the tray 60 and the rails 56, 58 may have specific, complementary engaging structure so that the tray 60 cannot fall off the rails.

Figure 3:
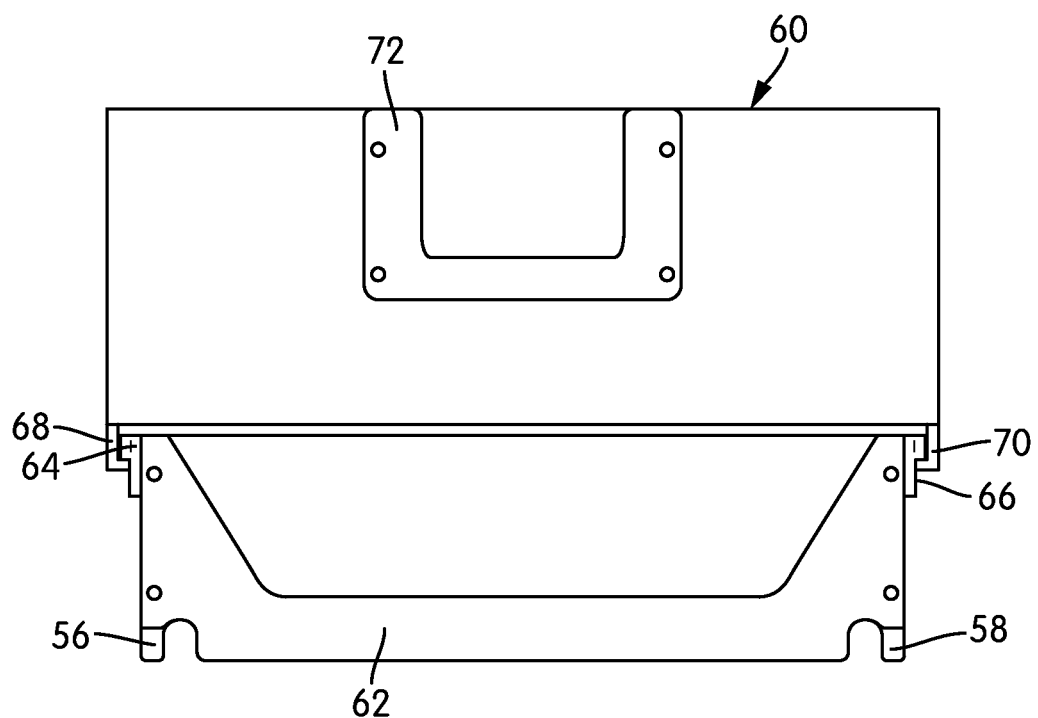
FIG. 3 is a front elevational view of a sliding tray, illustrating its engagement with support rails.
Figure 3A:
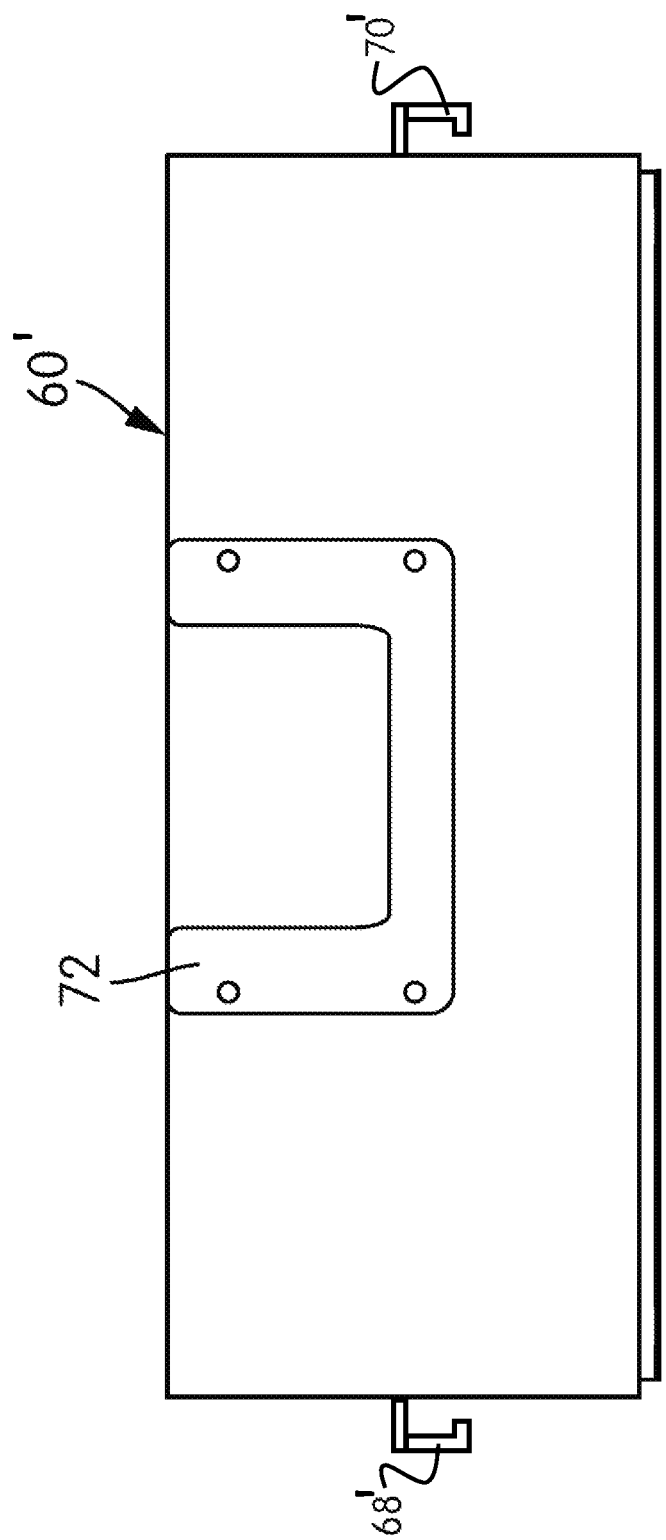
FIG. 3A is a front elevational view of a slightly modified version thereof (without its engagement with support rails being illustrated)

FIG. 3 is a front elevational view of the tray 60 and the rails 56, 58 in isolation, showing the engagement of the rails 56, 58 with the tray 60. In this embodiment, the rails 56, 58 are connected together by a plate 62 that is secured to each rail 56, 58 at two places along its height. On upper, outer surfaces proximate to their tops, the rails 56, 58 have outwardly-extending mounting flanges 64, 66. The flanges 64, 66 each have an inverted-L shape. As further illustrated in FIG. 3, the bottom edges of the tray 60 have inwardly-extending C-shaped flanges 68, 70 (i.e., exemplary rail-securing structures provided on the bottom of the organizing tray, as recited in the claims below) that fit over and slide along the mounting flanges 64, 66. The flanges 64, 66, 68, 70 may have breaks along their length that allow the tray 60 to be lifted from the mounting flanges 64, 66 if the tray 60 is slid to a specific position along the rails 56, 58. Of course, the mounting structures on the rails 56, 58 and the tray 60 may vary from embodiment to embodiment, both in style and in location. For example, as illustrated in FIG. 3A, C-shaped flanges 68', 70' could be provided on the sides of the tray 60' (i.e., exemplary rail-securing structures provided on the left and right sidewalls of the organizing tray, as recited in the claims below), rather than on the bottom of the tray as illustrated in FIG. 3. In that case, the tray 60' might be mounted between the rails 56, 58 (not shown in FIG. 3A). In this text, the phrase "mounted on the rails," and similar descriptions, should be construed to cover embodiments in which the tray 60 is suspended between the rails 56, 58.

As is also shown in FIG. 3, in this embodiment, the tray 60 includes a receiving bracket 72 (i.e., a first exemplary component-receiving bracket, as recited in the claims below) on its front sidewall. The purpose of the receiving bracket 72 will be described in more detail below.

In FIG. 2, the tray 60 is shown as the sole element that is mounted within the compartment 36. In other embodiments, the organizing system 50 may have other components that connect modularly to the tray 60, such that the tray 60 is mounted for sliding movement on the rails 56, 58 within the compartment 36, and any number of organizing attachments can be mounted to the tray 60, to the rails 56, 58, or to other components.

Figure 4:
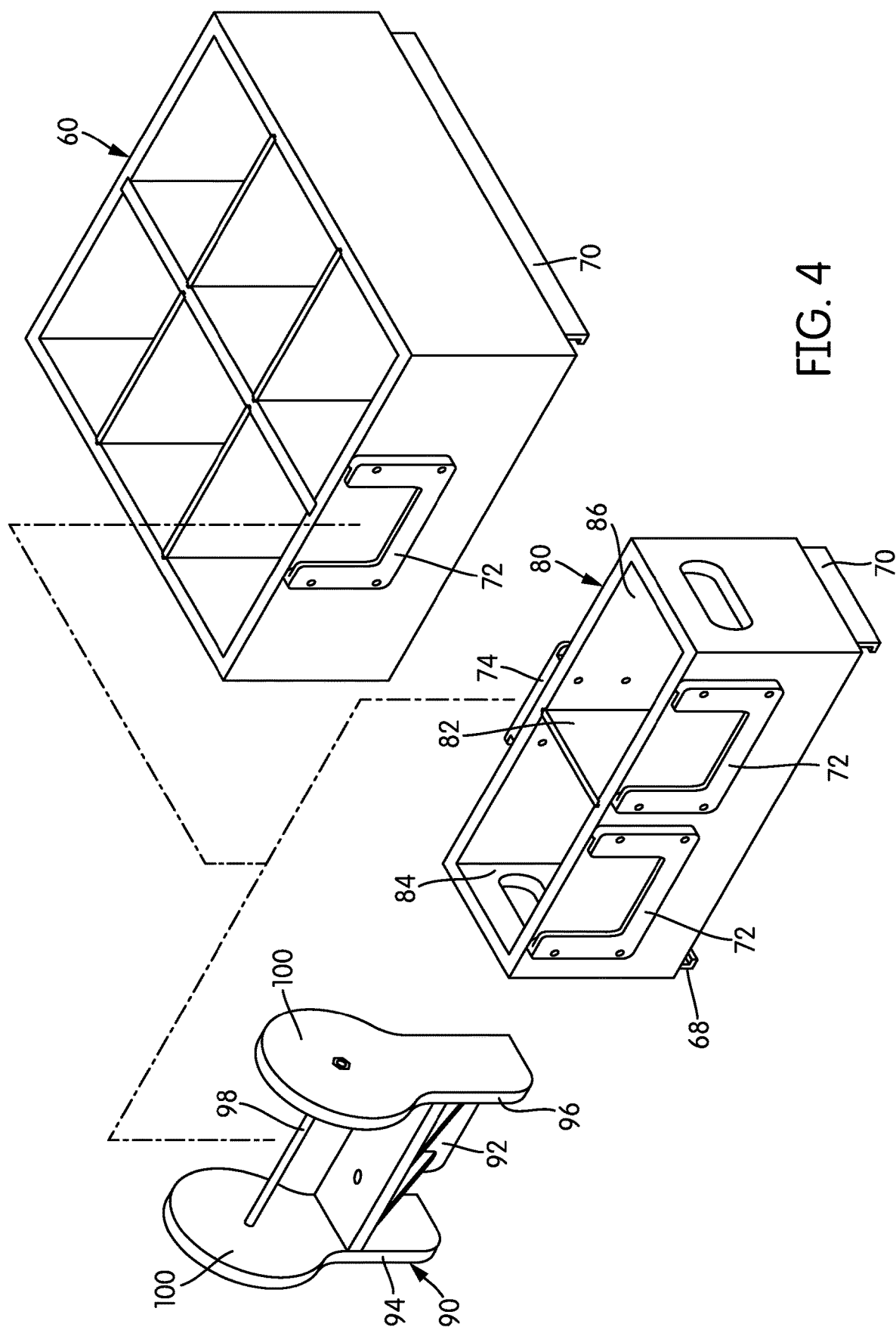
FIG. 4 is an exploded perspective view illustrating the attachment of accessories to the sliding tray of FIGS. 2-3.

FIG. 4 is an exploded perspective view that illustrates this concept. As in FIG. 3, the tray 60 has a receiving bracket 72. The receiving bracket 72 is female in this embodiment and accepts a complementary tongued male flange 74 (i.e., another exemplary component-receiving bracket—this one being complementary to the first exemplary component-receiving bracket mentioned above—as recited in the claims below). Generally speaking, any component that has the correct complementary mounting structure 74 can be mounted on the forward wall of the tray 60.

In the view of FIG. 4, two components are shown that could be interchangeably attached to the tray 60: an extension tray 80, and a spool holder 90. The extension tray is a rectilinear compartment of similar width and height to the tray 60, but with a shallower depth. In the illustrated embodiment, the extension tray 80 is subdivided by a single removable partition 82 into two compartments, 84, 86. The sidewalls of the extension tray 80 have hand-sized oval openings 88, allowing the extension tray to be lifted and carried with relative ease. In this embodiment, the bottom of the extension tray 80 has mounting structure 68, 70 for mounting directly to the rails 56, 58, although such structure 68, 70 may be absent in other embodiments.

The spool holder 90 is taller than the tray 60 and has a width about half that of the tray 60. In contrast to some of the other elements of the organization system 50, the spool holder 90 may be designed to be used only with the compartment 36 open; its height may exceed the height of the compartment 36, such that the lid of the compartment will not close with the spool holder 90 installed. One particular advantage of the accessory attachment system illustrated in these figures is that when the captain and passenger(s) on the boat are ready to fish, accessories like the spool holder 90 can be installed easily on the tray 60, and those accessories can be just as easily removed and returned to storage (e.g., in the compartment 36 below the tray 60) when no longer needed. Of course, the spool holder 90 may also be designed with a height that allows the compartment 36 to close.

The lower structure of the spool holder 90 includes a rearwardly-facing wall 92 (i.e., an exemplary lower portion thereof, as recited in the claims below) that carries a tongued male flange 74, i.e., a spool-attachment mounting structure (again, an exemplary component-receiving bracket that is complementary to the first exemplary component-receiving bracket mentioned above, as recited in the claims below), such that the spool holder 90 can be attached to the tray 60 using the receiving bracket 72. In the upper portion of the spool holder 90, a pair of uprights 94, 96, which are mirror images of one another, are spaced apart and connected by a rod 98. The overall arrangement is such that the rod 98 can be passed through the center of a spool of monofilament line or another such similar product, so that the spool can rotate around the rod 98 to dispense the line as needed. The upper portions 100 of the two uprights 94, 96 are circular and relatively large, usually larger than the sides of a typical spool that would be mounted on the spool holder 90. This may have the effect of preventing a spinning spool from contacting other objects, preventing both interference and possible injury from the spinning spool.

Figure 5:
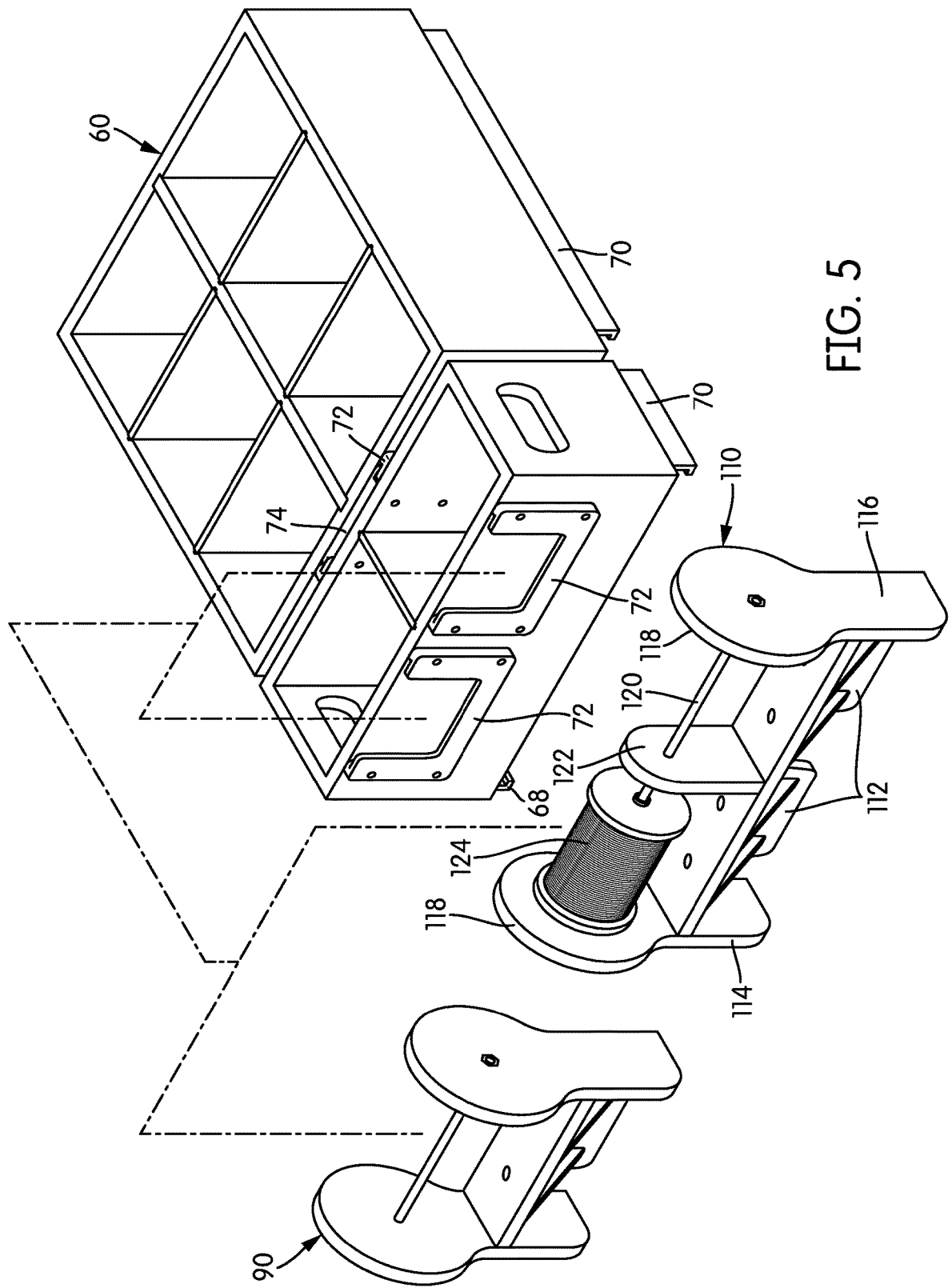
FIG. 5 is an exploded perspective view illustrating the attachment of an accessory tray and other accessories to the sliding tray of FIGS. 2-3.

In FIG. 4, the tray 60 is the connection point for accessories. However, that need not be the case in all embodiments. FIG. 5 is another exploded perspective view, this one showing the tray 60 with an extension tray 80 connected to it by engagement of the receiving bracket 72 on the tray 60 with the male flange 74 on the rearward side of the extension tray 80. The extension tray 80, with two receiving brackets 72 aligned but spaced from one another on its forward sidewall, acts as the connecting point for further accessories.

As shown in both FIGS. 4 and 5, the spool holder 90 may be mounted using one of the receiving brackets 72. FIG. 5 also shows a full-width spool holder 110 that may also be used. The full-width spool holder 110 has a lower section with two spaced-apart, rearwardly-facing mounting plates 112, each carrying a male flange 74. As with the spool holder 90, the full-width spool holder 110 has two uprights 114, 116 with enlarged, circular upper portions 118. A rod 120 connects the two circular upper portions 118. In the full-width spool holder 110, an additional upright 122 (i.e., an intermediate upright, as recited in the claims below) arises midway between the two main uprights 114, 116 to provide additional support to the rod 120. The rod 120 passes through the additional upright 122. The additional upright 122 defines two separate spool positions, each sized to accommodate a spool 124.

While the invention has been described with respect to certain embodiments, the description is intended to be exemplary, rather than limiting. Modifications and changes may be made within the scope of the invention, which is set forth in the appended claims.

What is claimed is:

1. An organizing system for a boat, comprising:
an organizing tray having a bottom and forward, rear, left, and right sidewalls arising from the bottom and one or more partitions dividing the organizing tray into a plurality of compartments, the organizing tray further comprising a component-receiving bracket on the forward sidewall or the rear sidewall thereof;
rail-securing structures provided on the left and right sidewalls of the organizing tray or the bottom of the organizing tray, the rail-securing structures adapted to secure the organizing tray to a pair of rails for sliding movement along the pair of rails;
an extension tray having a bottom and forward, rear, left, and right sidewalls arising from the bottom thereof; and
another component-receiving bracket mounted on the forward sidewall or the rear sidewall of the extension tray, said another component-receiving bracket being complementary to and engagable with the component-receiving bracket on the forward sidewall or the rear sidewall of the organizing tray.

2. An organizing system for a boat, comprising:
an organizing tray having a bottom and forward, rear, left, and right sidewalls arising from the bottom and one or more partitions dividing the organizing tray into a plurality of compartments, the organizing tray further comprising a component-receiving bracket on the forward sidewall or the rear sidewall thereof;
rail-securing structures provided on the left and right sidewalls of the organizing tray or the bottom of the organizing tray, the rail-securing structures adapted to secure the organizing tray to a pair of rails for sliding movement along the pair of rails; and
a spool holder, including:
   a pair of uprights;
   a lower portion connected between the pair of uprights, the lower portion having a spool-attachment mounting structure complementary to and engageable with the component-receiving bracket on the forward sidewall or the rear sidewall of the organizing tray; and
   a rod extending between corresponding upper portions of the pair of uprights.

3. The organizing system of claim 2, the spool attachment further comprising an intermediate upright spaced between the pair of uprights, the intermediate upright supporting the rod.

* * * * *